United States Patent
Kopp et al.

(10) Patent No.: US 11,171,373 B2
(45) Date of Patent: Nov. 9, 2021

(54) BATTERY MODULE INCLUDING PELTIER ELEMENT AND COMPENSATION ELEMENT BETWEEN TEMPERATURE REGULATING ELEMENT AND BATTERY CELL

(71) Applicant: Robert Bosch GmbH, Stuttgart (DE)

(72) Inventors: Benjamin Kopp, Remseck am Neckar (DE); Frank Gottwald, Weissach (DE); Markus Schmitt, Tamm (DE); Roman Marx, Moensheim (DE); Stefan Baumann, Altenriet (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 16/693,500

(22) Filed: Nov. 25, 2019

(65) Prior Publication Data
US 2020/0168967 A1    May 28, 2020

(30) Foreign Application Priority Data
Nov. 28, 2018   (DE) ...................... 10 2018 220 488.8

(51) Int. Cl.
*H01M 10/6572* (2014.01)
*H01M 10/613* (2014.01)

(52) U.S. Cl.
CPC ..... *H01M 10/6572* (2015.04); *H01M 10/613* (2015.04)

(58) Field of Classification Search
CPC .......................... H01M 10/6572; H01M 10/613
(Continued)

(56) References Cited

U.S. PATENT DOCUMENTS

2013/0014923 A1   1/2013   Germscheid et al.
2017/0256833 A1*  9/2017   Ciaccio ................... B60L 58/26
(Continued)

FOREIGN PATENT DOCUMENTS

CN        106374162 A  *  2/2017
DE        102008059955     6/2010
(Continued)

*Primary Examiner* — Sean P Cullen
(74) *Attorney, Agent, or Firm* — Michael Best & Friedrich LLP

(57) ABSTRACT

A battery module having at least one battery cell is disclosed, in particular a lithium-ion battery cell, comprising a housing, in which the at least one battery cell is accommodated, and a temperature-regulating element, wherein a Peltier element is furthermore arranged between the at least one battery cell and the temperature-regulating element, which Peltier element is thermally conductively connected in each case to the at least one battery cell and the temperature-regulating element, and which Peltier element is furthermore connected to a voltage source in such a way that heat transfer between the at least one battery cell and the temperature-regulating element is able to be formed by means of the Peltier element, wherein a compensation element for homogenizing the temperature, said compensation element being formed from a metallic material, is furthermore arranged between the at least one battery cell and the Peltier element, wherein preferably the at least one battery cell is directly or cohesively connected to the compensation element.

12 Claims, 2 Drawing Sheets

(58) Field of Classification Search
USPC .................................. 429/120, 149, 156, 159
See application file for complete search history.

(56) References Cited

U.S. PATENT DOCUMENTS

2017/0271729 A1    9/2017   Hirsch et al.
2018/0313584 A1   11/2018   Henke et al.

FOREIGN PATENT DOCUMENTS

| DE | 202012102349 | 7/2012 |
| DE | 102012018057 | 3/2014 |
| DE | 102014217338 | 3/2016 |
| DE | 102015220759 | 4/2017 |
| WO | 2017045877 | 3/2017 |

* cited by examiner

BATTERY MODULE INCLUDING PELTIER ELEMENT AND COMPENSATION ELEMENT BETWEEN TEMPERATURE REGULATING ELEMENT AND BATTERY CELL

BACKGROUND OF THE INVENTION

The invention is based on a battery module.

Furthermore, the present invention also relates to the use of such a battery module.

It is known from the prior art that battery modules can consist of a plurality of individual battery cells which can be electrically conductively interconnected with one another in series and/or in parallel. Furthermore, such battery modules are interconnected to form batteries or to form so-called battery packs or to form so-called battery systems. Battery systems usually having a plurality of such battery modules are used in particular in electrically operated vehicles or else in hybrid electric vehicles and in stationary applications.

Hybrid-driven electric vehicles (HEVs) and also electrically driven vehicles (EVs) require high-energy and high-capacity battery systems in order that the electric drive machines thereof can achieve driving performance levels to be achieved.

In this case, high-energy and high-capacity lithium-ion or lithium-polymer battery cells are usually used as electrical energy stores, with approximately 12 to 36 battery cells being interconnected to form a battery module.

Such high-performance battery cells here each have a capacity of approximately 8 to 20 ampere-hours (Ah).

Particularly during charging and discharging, lithium-ion or lithium-polymer battery cells heat up on account of chemical conversion processes primarily during the comparably faster energy emission or energy uptake.

The higher the performance of such a battery module or such a battery cell here, the greater the resulting heating, too, and so efficient and active temperature-regulating systems that can both heat and cool the battery cells are often required.

Predominantly, however, the battery cells are to be cooled in this case.

For lithium-ion battery cells, the optimum operating temperature is in a range of 5° C. to 35° C., wherein their lifetime is significantly reduced starting from operating temperatures of above 40° C., with the result that sufficient thermal conditioning of the battery cells is necessary for presenting a comparably long lifetime. In particular, such battery cells should be operated in a thermally noncritical state below 50° C. to 65° C. in all operating states and furthermore, in order to avoid different aging states or aging rates, the temperature gradient from battery cell to battery cell should only be comparably small.

In this case, lithium-ion battery cells of this type are cooled using temperature-regulating liquids that are normally at a temperature in the range of 25° C. to 35° C., which is generally also known as a low-temperature circuit, for example a heat transfer to the ambient air in the front region of the vehicle or a heat transfer to the air-conditioning circuit of the vehicle being formed for this purpose. In particular, the two possibilities can also be combined with one another in order to form more efficient cooling.

It is known here from the prior art that battery modules can have a cooling plate through which a temperature-regulating fluid can flow, such as a mixture of water and glycol, for example, which is configured to regulate the temperature of the battery cells of a battery module, that is to say to cool or else to heat them. In this case, the temperature-regulating fluid is guided for example through temperature-regulating medium channels of a cooling plate arranged below the battery module.

By way of example, the documents WO 2017 045 877 A1, DE 20 2012 102 349 U1 and DE 10 2008 059 955 A1 disclose such cooling plates known from the prior art, which are formed in particular from a first plate element and a second plate element cohesively connected to the first plate element or which for example can also be integrated into a housing of the battery module in order to form comparably short heat paths.

SUMMARY OF THE INVENTION

A battery module having at least one battery cell having the features of the invention affords the advantage that reliable and homogens temperature regulation of the at least one battery cell can be made available. In particular, such a battery module also affords the particular advantage that it is possible to effect heat dissipation for the at least one battery cell at a comparably higher temperature, such as e.g. 50° C. to 65°.

To that end, the invention provides a battery module having at least one battery cell. In this case, the at least one battery cell is formed in particular as a lithium-ion battery cell.

In this case, the battery module comprises a housing, in which the at least one battery cell is accommodated.

The battery module furthermore comprises a temperature-regulating element.

In this case, a Peltier element is furthermore arranged between the at least one battery cell and the temperature-regulating element.

In this case, the Peltier element is thermally conductively connected in each case to the at least one battery cell and the temperature-regulating element.

Furthermore, the Peltier element is connected to a voltage source in such a way that heat transfer between the at least one battery cell and the temperature-regulating element is able to be formed by means of the Peltier element.

In this case, a compensation element configured for homogenizing the temperature, said compensation element being formed form a metallic material, is furthermore arranged between the at least one battery cell and the Peltier element.

In this case, the at least one battery cell is preferably directly or cohesively connected to the compensation element.

Advantageous developments and improvements of the device specified in the independent claim are possible by virtue of the measures presented in the dependent claims.

In this case, the Peltier element is formed in particular as a thermoelectric transducer and is furthermore formed in such a way that in the event of an electric current flowing through, a temperature difference is formed.

In particular, however, the Peltier element is formed in such a way that in the event of an electric current flowing through in a first direction, heat is transferred from the at least one battery cell to the temperature-regulating element, and that in the event of an electric current flowing through in a second direction, heat is transferred from the temperature-regulating element to the at least one battery cell.

Therefore, by means of the Peltier element arranged between the temperature-regulating element and the at least one battery cell, on the one hand it is possible to support or intensify natural heat conduction between the at least one battery cell and the temperature-regulating element, that is to say, to put it another way, heat can be conducted counter to the direction of an existing temperature gradient, and on the other hand it is possible to form heat conduction between the at least one battery cell and the temperature-regulating element that is conducted in the direction of an existing temperature gradient, that is to say acts counter to the natural heat conduction.

A plurality of Peltier elements can preferably be arranged in this case.

As a result, it is possible to lower a temperature level on the part of the at least one battery cell by means of the Peltier element, as a result of which it is possible to supply the temperature-regulating element, for example by way of a temperature-regulating liquid preferably formed as a mixture of water and glycol, even at comparably higher temperatures, such as temperatures between 50° C. and 65° C.

What can be achieved as a result of the arrangement of the compensation element between the at least one battery cell and the Peltier element is that heat uniformly can be dissipated from the at least one battery cell or can be fed thereto.

Particularly with use of Peltier elements which, on account of their size, cannot cover an entire side surface of the at least one battery cell, such as a bottom surface of the at least one battery cell, for example, by means of the compensation element it is possible for heat uniformly to be dissipated from the entire bottom surface or to be fed thereto.

In particular, the compensation element covers the entire bottom surface of the at least one battery cell.

It is preferred if a thermal compensation material is arranged between the at least one battery cell and the compensation element, if a thermal compensation material is arranged between the compensation element and the Peltier element and/or if a thermal compensation material is arranged between the Peltier element and the temperature-regulating element.

In each case a comparably better thermal linking can be formed as a result.

The thermal compensation material can also be designated in English as "thermal interface material" (TIM).

In this case, such a thermal compensation material can preferably be formed from a material formed in an elastically deformable fashion, a viscous material or else from a thermally conductive adhesive.

It is expedient if the temperature-regulating element is formed by the housing of the battery module. Preferably, in this case, the temperature-regulating element can in particular be integrated into the housing of the battery module.

By way of example, the temperature-regulating element can be formed as a channel structure through which temperature-regulating fluid can flow and which is integrated for example into a housing wall, such as preferably a bottom, of the housing.

As a result, firstly it is possible to provide a simple embodiment of the battery module, and secondly it is also possible to form reliable temperature regulation.

It is particularly expedient if the temperature-regulating fluid is formed such that a temperature-regulating medium, e.g. a temperature-regulating liquid or a temperature-regulating gas, is able to flow through it.

Such an embodiment affords the advantage of reliable temperature regulation. It goes without saying that it is also possible, however, for a temperature-regulating gas to be able to flow through the temperature-regulating element.

Furthermore, it is also conceivable for the temperature-regulating element to comprise a phase change material, wherein the phase change material can be arranged in addition to a throughflow with a temperature-regulating liquid or wherein the temperature-regulating element can comprise only a phase change material.

In accordance with one particularly preferred aspect of the invention, the voltage source is formed by the at least one battery cell.

This affords the advantage that the at least one battery cell can be used to regulate its temperature itself.

In particular, in this case it is possible for electric current from the at least one battery cell to flow through the Peltier element in such a way that the Peltier element transfers heat from the at least one battery cell to the temperature-regulating element and thus serves for cooling the at least one battery cell.

In particular, in this case it is also possible for electric current from the at least one battery cell to flow through the Peltier element in such a way that the Peltier element transfers heat from the temperature-regulating element to the at least one battery cell and thus serves for heating the at least one battery cell. This also affords the additional advantage, in particular, that Joule heating of the at least one battery cell that arises during the electrical supply of the Peltier element furthermore supports the heating up of said at least one battery cell.

Consequently, it is thus possible, by changing the flow direction of an electric current flowing through the Peltier element, to form heating or cooling of the at least one battery cell, with the result that for example additional components such as continuous-flow heaters or heating films, for example, can be dispensed with.

Preferably, the battery module can comprise a control unit configured to drive the voltage source and in particular the at least one battery cell.

Furthermore, the control unit can preferably also be configured to control the flow direction of the electric current flowing through the Peltier element in order either to heat or to cool the at least one battery cell.

In accordance with one preferred aspect of the invention, an electronic element of the battery module can be arranged at a side of the temperature-regulating element facing away from the at least one battery cell.

This affords the advantage that further electronic elements can be reliably temperature-regulated. In particular, in this case it is possible that, by means of a temperature-regulating element that can be at a temperature of between 50° C. and 65° C., for example, both the at least one battery cell can be temperature-regulated and the electronic element of the battery module can be temperature-regulated.

It is expedient if the cohesive connection between the at least one battery cell and the compensation element is formed by means of a thermally conductive adhesive. As a result, firstly it is possible to form a reliable mechanical linking of the at least one battery cell to the compensation element, and secondly it is also possible to form reliable heat conduction between the at least one battery cell and the compensation element.

It is expedient if the battery module comprises a plurality of battery cells. In particular, the plurality of battery cells in this case are electrically interconnected with one another in series and/or in parallel.

The present invention also relates to the use of a battery module according to the invention as just described in such a way that the voltage source supplies the Peltier element with a voltage in such a way that heating of the at least one battery cell or cooling of the at least one battery cell is formed.

BRIEF DESCRIPTION OF THE DRAWINGS

Exemplary embodiments of the invention are illustrated in the drawings and explained in greater detail in the following description.

In the figures.

DETAILED DESCRIPTION

Figure 1:
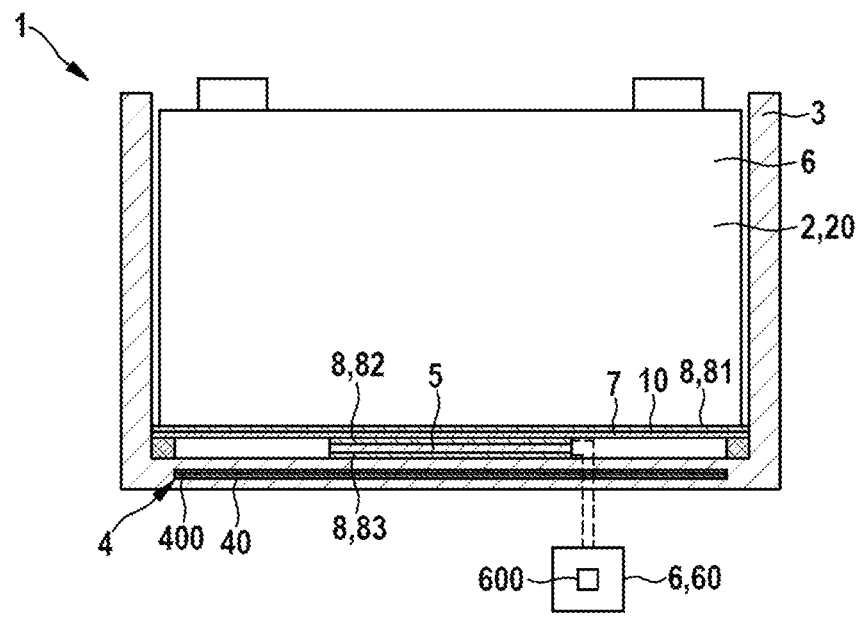
FIG. 1 shows a first embodiment of a battery module according to the invention in a sectional view from the side.

FIG. 1 shows a first embodiment of a battery module 1 according to the invention in a sectional view from the side.

In this case, the battery module 1 comprises at least one battery cell 2. In particular, the battery cell 2 in this case is formed as a lithium-ion battery cell 20. The battery module 1 preferably comprises a plurality of battery cells 2.

The battery module 1 comprises a housing 3. In this case, the at least one battery cell 2 is accommodated in the housing 3.

Furthermore, the battery module 1 comprises a temperature-regulating element 4. Preferably, in this case, the temperature-regulating element 4 is formed by the housing 3 of the battery module 1. In particular, in this case, the temperature-regulating element 4 is integrated into the housing 3 of the battery module 1. By way of example, the temperature-regulating element 4 can be formed such that a temperature-regulating liquid 400 is able to flow through it. In particular, for this purpose the temperature-regulating element 4 can be formed as a flow channel 40 formed such that a temperature-regulating liquid 400 is able to flow through it.

Furthermore, a Peltier element 5 is arranged between the at least one battery cell 2 and the temperature-regulating element 4.

The Peltier element 5 is thermally conductively connected to the at least one battery cell 2 and is furthermore thermally conductively connected to the temperature-regulating element 4.

In this case, the Peltier element 5 is furthermore connected to a voltage source 6, such that heat transfer between the at least one battery cell 2 and the temperature-regulating element 4 is able to be formed by means of the Peltier element 5.

In particular, for this purpose, on the one hand, heat can be transferred from the at least one battery cell 2 to the Peltier element 5 and can be transferred further from the Peltier element 5 to the temperature-regulating element 4.

In particular, for this purpose, on the other hand, heat can be transferred from the temperature-regulating element 4 to the Peltier element 5 and can be transferred further from the Peltier element 5 to the at least one battery cell 2.

In this case, on the one hand, as indicated in FIG. 1, the voltage source 6 can be formed as an external voltage source 60, which is connected to the Peltier element 5 in an electrically conductive manner and in terms of control engineering. In this case, the voltage source 6 can furthermore also comprise a control unit 600 configured to drive and also to control the voltage source 6.

Furthermore, in this case, on the other hand, the voltage source 6 can also be formed by the at least one battery cell 2, which, for this purpose, is electrically conductively connected to the Peltier element 5 in such a way that an electric current provided by the at least one battery cell 2 can flow through the Peltier element 5.

In this case, a compensation element 7 is furthermore arranged between the at least one battery cell 2 and the Peltier element 5, said compensation element being formed from a metallic material, such as, for example, aluminum, copper or nickel or mixtures thereof, and serving to homogenize the temperature.

In particular, the compensation element 7 is formed from a material having comparably good thermal conductivity.

Preferably, in this case, the at least one battery cell 2 is directly or cohesively connected to the compensation element 7.

If the at least one battery cell 2 is cohesively connected to the compensation element 7, the cohesive connection between the at least one battery cell 2 and the compensation element 7 can preferably be formed by means of a thermally conductive adhesive 10.

As can be discerned from FIG. 1, a thermal compensation material 8, in particular a first thermal compensation material 81, is preferably arranged between the at least one battery cell 2 and the compensation element 7.

As can furthermore be discerned from FIG. 1, a thermal compensation material 8, in particular a second thermal compensation material 82, is preferably arranged between the compensation element 7 and the Peltier element 5.

As can furthermore also be discerned from FIG. 1, a thermal compensation material 8, in particular a third thermal compensation material 83, is preferably arranged between the Peltier element 5 and the temperature-regulating element 4.

The battery module 1 can then be used in such a way that the voltage source 6 supplies the Peltier element 5 with voltage in such a way that heating of the at least one battery cell 2 can be formed or that cooling of the at least one battery cell can be formed.

Figure 2:
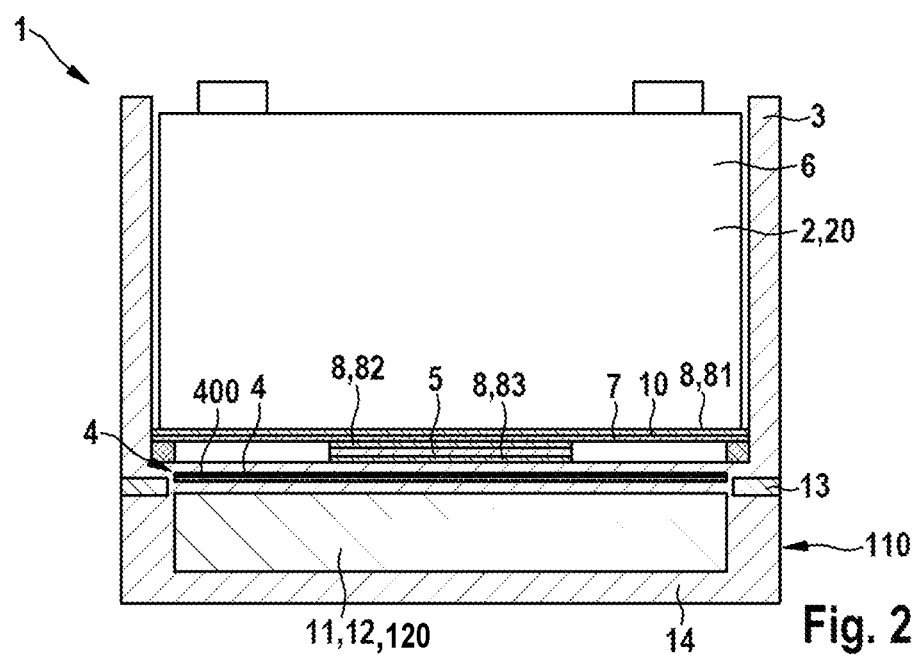
FIG. 2 shows a second embodiment of a battery module according to the invention in a sectional view from the side.

FIG. 2 shows a second exemplary embodiment of a battery module 1 according to the invention in a sectional view.

In this case, the second embodiment of the battery module 1 according to the invention as shown in FIG. 2 differs from the first embodiment of the battery module 1 as shown in FIG. 1 in that an electronic element 11 of the battery module, such as a DC/DC converter 12 or inverter 120, for example, is arranged at a side 110 of the temperature-regulating element 4 facing away from the at least one battery cell 2.

To that end, the housing 3 of the battery module 1, by means of a connecting element 13, can be connected to the electronic element 11 of the battery module 1 or, as shown in FIG. 2, to a housing 14 accommodating the electronic element 11.

Typically, heat is dissipated from electronic elements 11 of the battery module 1 at relatively high temperatures, such as 50° C. to 65° C., for example, with the result that heat dissipation of this type is possible by means of a battery module 1 according to the invention.

Figure 3:
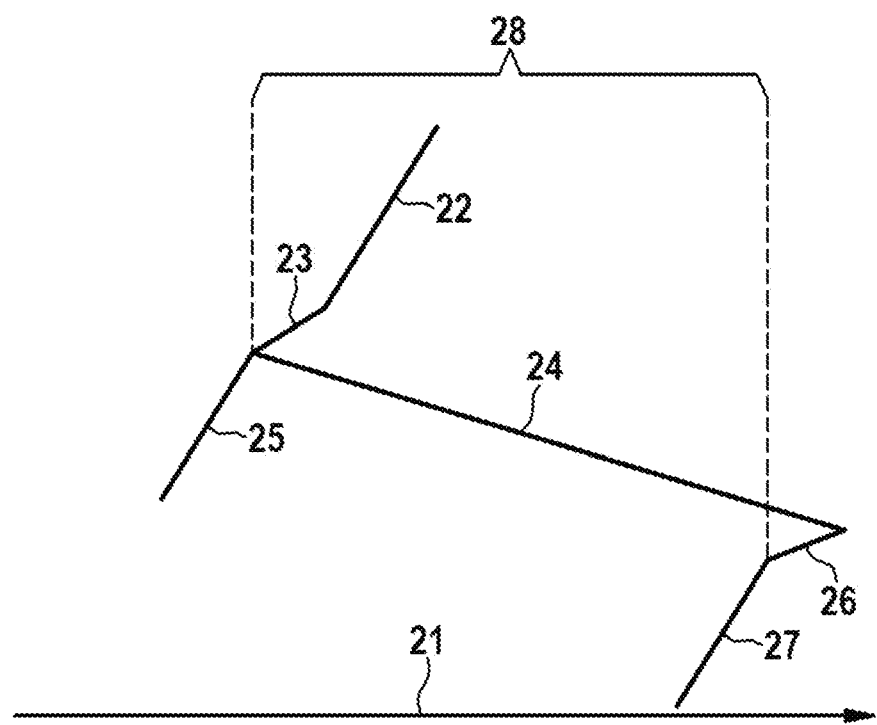
FIG. 3 shows an exemplary illustration of a temperature profile.

FIG. 3 shows an exemplary illustration of a temperature profile.

In this case, a spatial component is plotted against the temperature 21.

Firstly, the temperature profile 22 within the at least one battery cell 2 can be discerned, wherein the temperature decreases from an interior of the at least one battery cell 2 to an exterior of the at least one battery cell 2.

Afterward, the temperature profile 23 within the first thermal compensation material 81 can be discerned, wherein the temperature decreases in a direction facing away from the at least one battery cell 2.

Afterward, the temperature profile 24 of the Peltier element 5 is shown, on the one hand, this temperature profile also decreasing in a direction facing away from the at least one battery cell 2.

The temperature profile 25 within the temperature-regulating element 4 is shown, on the other hand, without the arrangement of a Peltier element 5.

Afterward, the temperature profile 26 within the second thermal compensation material 82 can be discerned, wherein the temperature decreases in a direction facing away from the at least one battery cell 2.

Furthermore, the temperature profile 27 within the temperature-regulating element 4 is shown with the arrangement of a Peltier element 5.

The temperature difference 28 depicted corresponds here to the advantageous temperature reduction as a result of the arrangement of the Peltier element 5.

The invention claimed is:

1. A battery module having at least one battery cell (2), comprising
    a housing (3), in which the at least one battery cell (2) is accommodated, and
    a temperature-regulating element (4),
    wherein a Peltier element (5) is furthermore arranged between the at least one battery cell (2) and the temperature-regulating element (4),
    wherein the Peltier element is thermally conductively connected in each case to the at least one battery cell (2) and the temperature-regulating element (4),
    wherein the Peltier element is furthermore connected to a voltage source (6) in such a way that the Peltier element is configured to transfer heat between the at least one battery cell (2) and the temperature-regulating element (4),
    wherein a compensation element (7) for homogenizing the temperature, said compensation element being formed from a metallic material, is furthermore arranged between the at least one battery cell (2) and the Peltier element (5), and
    wherein the at least one battery cell (2) is cohesively connected to the compensation element (7) by a thermally conductive adhesive (10) which directly adheres to the at least one battery cell (2) and to the compensation element (7).

2. The battery module according to claim 1,
characterized in that
the temperature-regulating element (4) is formed by the housing (3) of the battery module (1).

3. The battery module according to claim 1,
characterized in that
the temperature-regulating element (4) is formed by the housing (3) of the battery module (1), wherein the temperature-regulating element (4) is integrated into the housing (3).

4. The battery module according to claim 1,
characterized in that
the temperature-regulating element (4) is formed such that a temperature-regulating medium (400) is able to flow through the temperature-regulating element (4).

5. The battery module according to claim 1,
characterized in that
the voltage source (6) is formed by the at least one battery cell (2).

6. The battery module according to claim 1,
characterized in that
the battery module (1) furthermore comprises a control unit (600) configured to drive the voltage source (6).

7. The battery module according to claim 1,
characterized in that
an electronic element (11) of the battery module (1) is arranged at a side (110) of the temperature-regulating element (4) facing away from the at least one battery cell (2).

8. The battery module according to claim 1,
characterized in that
the battery module (1) has a plurality of battery cells (2).

9. The battery module according to claim 1, wherein the at least one battery cell (2) includes a top surface having battery terminals and a bottom surface opposite the top surface, and wherein the compensation element (7) is on the bottom surface of the at least one battery cell (2).

10. The battery module according to claim 9, wherein the compensation element (7) covers the entire bottom surface of the at least one battery cell (2).

11. A method of operating a battery module (1) according to claim 1, the method comprising
    supplying to the Peltier element, with the voltage source (6), a voltage in such a way that the at least one battery cell (2) is heated or the at least one battery cell (2) is cooled.

12. A battery module having at least one lithium-ion battery cell (2), comprising
    a housing (3), in which the at least one battery cell (2) is accommodated, and
    a temperature-regulating element (4),
    wherein a Peltier element (5) is furthermore arranged between the at least one battery cell (2) and the temperature-regulating element (4),
    wherein the Peltier element is thermally conductively connected in each case to the at least one battery cell (2) and the temperature-regulating element (4),
    wherein the Peltier element is furthermore connected to a voltage source (6) in such a way that the Peltier element is configured to transfer heat between the at least one battery cell (2) and the temperature-regulating element (4),
    wherein a compensation element (7) for homogenizing the temperature, said compensation element being formed from a metallic material, is furthermore arranged between the at least one battery cell (2) and the Peltier element (5), and
    wherein the at least one battery cell (2) is cohesively connected to the compensation element (7) by a thermally conductive adhesive (10) which directly adheres to the at least one battery cell (2) and to the compensation element (7).

* * * * *